(12) United States Patent
Tang et al.

(10) Patent No.: US 10,161,756 B2
(45) Date of Patent: Dec. 25, 2018

(54) NAVIGATION METHOD AND DEVICE

(71) Applicant: Xiaomi Inc., Beijing (CN)

(72) Inventors: Mingyong Tang, Beijing (CN); Huayijun Liu, Beijing (CN); Tao Chen, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/054,250

(22) Filed: Feb. 26, 2016

(65) Prior Publication Data
US 2016/0290815 A1    Oct. 6, 2016

(30) Foreign Application Priority Data
Mar. 30, 2015    (CN) .......................... 2015 1 0145113

(51) Int. Cl.
| | | |
|---|---|---|
| *G01C 21/34* | (2006.01) | |
| *B60W 40/00* | (2006.01) | |
| *B60Q 9/00* | (2006.01) | |
| *G01C 21/36* | (2006.01) | |
| *G01G 19/08* | (2006.01) | |
| *B60W 40/06* | (2012.01) | |

(52) U.S. Cl.
CPC .............. *G01C 21/34* (2013.01); *B60Q 9/00* (2013.01); *B60W 40/06* (2013.01); *G01C 21/3453* (2013.01); *G01C 21/3461* (2013.01); *G01C 21/3697* (2013.01); *G01G 19/08* (2013.01)

(58) Field of Classification Search
CPC .............. G01C 21/34; G01C 21/3453; G01C 21/3461; G01C 21/3697; B60Q 9/00; B60W 40/06; G01G 19/08
See application file for complete search history.

(56) References Cited

U.S. PATENT DOCUMENTS

| | | | | |
|---|---|---|---|---|
| 5,472,032 A | * | 12/1995 | Winston | ................ B60C 23/004 152/415 |
| 5,913,917 A | | 6/1999 | Murphy | |
| 5,948,035 A | * | 9/1999 | Tomita | .................... B60T 8/172 180/197 |
| 6,293,562 B1 | * | 9/2001 | Kutscher | .............. B60G 17/016 280/5.5 |
| 8,909,466 B2 | * | 12/2014 | Rogers | ............... G01C 21/3415 701/400 |

(Continued)

FOREIGN PATENT DOCUMENTS

| | | | | |
|---|---|---|---|---|
| GB | 2421343 A | * | 6/2006 | ......... B60C 23/0408 |
| JP | H 6-72113 | | 3/1994 | |

(Continued)

OTHER PUBLICATIONS

Extended European Search Report dataed Aug. 22, 2016, in counterpart European Patent Application No. 16159410.6-1557.

(Continued)

*Primary Examiner* — Frederick M Brushaber

(74) *Attorney, Agent, or Firm* — Finnegan, Henderson, Farabow, Garrett & Dunner LLP

(57) ABSTRACT

A navigation method includes: obtaining status information of one or more tires of a vehicle; obtaining road condition information in real time; and performing a route navigation for the vehicle according to the status information, the road condition information, and a preset navigation strategy.

18 Claims, 6 Drawing Sheets

(56) References Cited

U.S. PATENT DOCUMENTS

| | | | |
|---|---|---|---|
| 2004/0134270 A1* | 7/2004 | Hirohama | B60C 23/0416 73/146 |
| 2009/0080703 A1* | 3/2009 | Hammerschmidt | G06T 7/0004 382/104 |
| 2009/0259354 A1* | 10/2009 | Krupadanann | B60W 10/06 701/22 |
| 2010/0217471 A1* | 8/2010 | Stennnan | B60C 23/061 701/31.4 |
| 2010/0272370 A1* | 10/2010 | Schilling | G06T 7/62 382/199 |
| 2012/0296515 A1 | 11/2012 | Boss et al. | |
| 2013/0261966 A1 | 10/2013 | Wang et al. | |
| 2014/0039752 A1* | 2/2014 | Juzswik | B60C 23/02 701/34.4 |
| 2014/0114558 A1* | 4/2014 | Singh | B60C 23/0488 701/124 |
| 2014/0278041 A1* | 9/2014 | Brenninger | B60W 40/13 701/124 |
| 2014/0279707 A1* | 9/2014 | Joshua | G06Q 30/0283 705/400 |
| 2014/0303886 A1 | 10/2014 | Roemersperger et al. | |
| 2014/0309845 A1* | 10/2014 | Wittmann | G01L 17/00 701/31.5 |
| 2015/0019165 A1 | 1/2015 | Theuss et al. | |

FOREIGN PATENT DOCUMENTS

| | | |
|---|---|---|
| JP | H 11-2535 A | 1/1999 |
| JP | H 11-258029 A | 9/1999 |
| JP | 2004-93212 A | 3/2004 |
| JP | 2005-119533 A | 5/2005 |
| JP | 2006-281836 A | 10/2006 |
| JP | 2012-218682 A | 11/2012 |
| KR | 10-2009-0067563 A | 6/2009 |
| KR | 10-2009-0074881 A | 7/2009 |
| KR | 10-2009-0122558 A | 12/2009 |

OTHER PUBLICATIONS

Japanese Office Action dated Jun. 6, 2017, in counterpart Japanese Patent Application No. 2016-525085.
Korean Office Action dated Jul. 5, 2017, in counterpart Korean Patent Application No. 10-2016-7000771.

* cited by examiner

NAVIGATION METHOD AND DEVICE

CROSS-REFERENCE TO RELATED APPLICATIONS

This application is based upon and claims priority to Chinese Patent Application No. 201510145113.5, filed on Mar. 30, 2015, the entire content of which is incorporated herein by reference.

FIELD

The present disclosure relates to navigation technology and, more particularly, to a navigation method and a navigation device.

BACKGROUND

Currently, vehicle navigations are realized mostly by Global Positioning System (GPS). The GPS has the advantages of precise positioning and strong versatility. However, in an actual driving process, the positioning and navigation relying only on GPS may no longer satisfy the driving demand of a user.

SUMMARY

According to a first aspect of the present disclosure, a navigation method is provided. The method includes: obtaining status information of one or more tires of a vehicle; obtaining road condition information in real time; and performing a route navigation for the vehicle according to the status information, the road condition information, and a preset navigation strategy.

According to a second aspect of the present disclosure, a navigation device is provided. The navigation device includes: a processor; and a memory configured to store instructions executable by the processor. The processor is configured to: obtain status information of one or more tires of a vehicle; obtain road condition information in real time; and perform a route navigation for the vehicle according to the status information, the road condition information, and a preset navigation strategy.

According to a third aspect of the present disclosure, a non-transitory computer-readable storage medium is provided. The non-transitory computer-readable storage medium has stored therein instructions that, when executed by a processor of a terminal, cause the terminal to perform a navigation method. The navigation method includes: obtaining status information of one or more tires of a vehicle; obtaining road condition information in real time; and performing a route navigation for the vehicle according to the status information, the road condition information, and a preset navigation strategy.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Exemplary embodiments will be described in detail herein, and examples thereof are illustrated in accompanying drawings. Throughout figures referred by the following description, the same reference number in different figures indicates the same or similar elements unless otherwise stated. Implementations described in the following exemplary embodiments do not represent all the implementations consistent with the present disclosure. Instead, they are only examples of the device and method consistent with some aspects of the present disclosure detailed in the appended claims. Terms in the present disclosure are only used to describe specific embodiments, and do not intend to limit the present disclosure. The singular forms such as "a", "an" and "the" in the present disclosure and the appended claims also intend to include plural forms, unless otherwise specified in the context. It should also be understood that, the term "and/or" used herein refers to and includes any or all possible combinations of one or more listed items associated with each other.

It should be appreciated that, although terms such as first, second and third are used in the present disclosure for describing various information, the information are not limited to these terms. These terms are only used to distinguish the same type of information. For example, without departing from the scope of the present disclosure, the first information may also be referred to as the second information, and similarly, the second information may be referred to as the first information. Depending on the context, the word "if" used herein may be interpreted as "when . . . " or "upon . . . " or "in response to determining . . . ".

In the related art, vehicle navigation is mainly realized based on GPS. The GPS navigation system usually plans an optimal drive route with a shorter distance or with lighter traffic for a user. However, the actual drive environment is complicated and variable, and the GPS navigation system does not consider some external factors that may affect the drive safety of users when planning the route. Thus, sometimes the planned drive route may not be the optimal route in the complicated drive environment.

To this end, a new navigation method is provided in the present disclosure, which obtains status information of one or more tires of a vehicle and real-time road condition information, and then performs a route navigation for the vehicle according to the status information, the road condition information, and a preset navigation strategy. In this way, the navigation may be performed according to the status of the tires of the vehicle and the real-time road condition during driving, which not only enriches existing navigation systems, but also enables users to adapt to more complicated drive environment.

Figure 1:
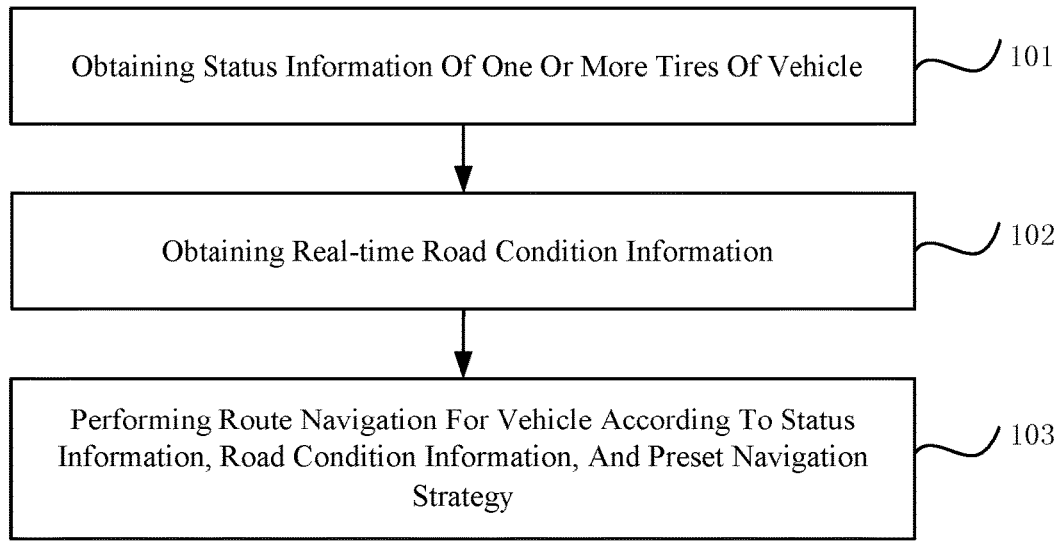
FIG. 1 is a flow chart of a navigation method according to an exemplary embodiment.

FIG. 1 is a flow chart of a navigation method according to an exemplary embodiment. The navigation method is applied in a terminal. As shown in FIG. 1, the navigation method includes following steps.

In step 101, status information of one or more tires of a vehicle is obtained.

In step 102, road condition information is obtained in real time.

The order of step 101 and step 102 may be exchanged.

In step 103, a route navigation is performed for the vehicle according to the status information, the road condition information, and a preset navigation strategy.

In the present disclosure, the terminal may be a handheld terminal. For example, the handheld terminal may be a smart phone or a specific handheld navigation device. Besides the handheld terminal, the terminal may also be an in-vehicle terminal. For example, the terminal may be a specific in-vehicle navigation device or a navigation module in an in-vehicle system. The vehicle may be a traditional vehicle, an electric vehicle, or a hybrid vehicle.

In a conventional driving process, once the user chooses a destination, the terminal may locate a current location of the vehicle via the GPS, set the current location as a starting point, and then plan an optimal drive route for the vehicle after analyzing a map database or a GPS database pre-loaded locally. However, the drive route is planned based only on locations obtained via GPS, without considering some external factors that may affect drive safety. Thus, the planned drive route may not be the optimal route in a complicated drive environment.

For example, assume a road section with a height limit is on a drive route planned by a GPS navigation system, and the current height of the vehicle has exceeded the height limit. Then, if the GPS navigation system does not consider the actual height of the vehicle when planning the drive route, the user may be in danger when driving through the road section with the height limit according to drive route planned by the GPS navigation system. For another example, assume that there is a slippery road on the drive route planned by the GPS navigation system, and the current tire pressure of the vehicle is too high, which may cause a slip while driving on the slippery road. Then, the user may be in danger when driving through the slippery road according to the drive road planned by the GPS navigation system.

In order to ensure that the drive route planned for the user is safe and reliable, in the present embodiment, while planning the drive route for a vehicle, the terminal refers to the status information of one or more tires of the vehicle and the real-time road condition information, and takes the status information of the tires of the vehicle and the real-time road condition information as important factors in route planning based on GPS navigation, thus improving the reliability of the drive route planned for users.

In the present embodiment, the status information of the tires of the vehicle may include shape change information or tire pressure information of the tires of the vehicle. The shape change information may be the height change information or volume change information of the tires of the vehicle, etc. The road condition information may include weather information, maximum load limits on possible drive routes that may be planned for the vehicle, and maximum height limits on the possible drive routes. A maximum load limit on a possible drive route or a maximum height limit on the possible drive route may be obtained by analyzing and screening road sections on the possible drive route according to a maximum load limit or a maximum height limit on each road section. For example, in order to ensure passing a possible drive route without causing danger, the maximum load limits or the maximum height limits on all sections of the possible drive route may be analyzed, and a minimum value of the maximum load limits or the maximum height limits on all sections is regarded as the maximum load limit or the maximum height limit on the possible drive route.

In exemplary embodiments, while planning a drive route for a vehicle, the terminal first obtains the shape change information and tire pressure information of one or more tires of the vehicle as well as the real-time road condition information. The shape change information of the tires of the vehicle may be collected via one or more cameras preset on the vehicle at fixed locations. For example, one camera may be fixed above each tire of the vehicle, and the camera may record pictures of the tire periodically, and then save the recorded pictures in a preset memory device. The terminal may obtain the shape change information of the tire by reading the pictures from the memory device and comparing the pictures to obtain the shape change information such as the height difference change or the volume change. The tire pressure information of the tires of the vehicle may be collected by a preset tire pressure measurement device, and after collecting, the collected data may be saved in the preset memory device or manually input to the preset memory device by the user. Thus, the terminal may obtain the tire pressure information by directly reading the data from the memory device. The real-time road condition information such as the weather information, the maximum load limits on the possible drive routes, and the maximum height limits on the possible drive routes, may be collected through a third-party public service platform or may be manually input to the third-party service platform by a traffic administration staff. Thus the terminal may obtain the real-time road condition information by establishing a connection with the third-party public service platform and synchronizing data from the third-party public service platform in real time.

After obtaining the shape change information and the tire pressure information of the tires of the vehicle as well as the real-time road condition information, the terminal may perform the route navigation according to the obtained information and a preset navigation strategy, and plan a safe drive route for the vehicle. The preset navigation strategy may be configured by the user according to the actual drive environment. In different drive environments, different navigation strategies may be configured respectively.

In the present embodiment, the navigation strategy may be as follows. After planning the drive route for the vehicle, the terminal obtains a maximum load limit on the planned drive route based on maximum load limits of bridges and road surfaces on each section of the planned drive route, computes a current load of the vehicle according to the shape change information or the tire pressure information, and determines whether the current load of the vehicle exceeds the maximum load limit on the planned drive route. If the current load of the vehicle exceeds the maximum load limit on the planned drive route, the planned drive route may be determined as a dangerous road, and in this case, an alarm may be sent to the user, and an alternative safe route may be planned to avoid the dangerous road.

After computing the current load of the vehicle according to the shape change information or the tire pressure information, the terminal may also judge whether the current load of the vehicle exceeds a maximum load limit of the vehicle. The maximum load limit of the vehicle may be obtained by obtaining a type of the vehicle and searching a database according to the type. The type of the vehicle may be obtained by image recognition by the preset camera, or by identifying an in-vehicle chip and reading the type information carried in the in-vehicle chip. When the current load of the vehicle is judged as exceeding the maximum load limit of the vehicle, the vehicle may be determined as overloaded, and an alarm may be sent to the user, a traffic administration may be notified automatically, or the vehicle may be locked automatically to prevent starting.

In the present embodiment, the navigation strategy may also be as follows. After planning the drive route for the vehicle, the terminal obtains the maximum height limit on the planned drive route, computes the current height of the vehicle according to the shape change information or the tire pressure information, and judges whether the current height of the vehicle exceeds the maximum height limit on the planned drive route. If the current height exceeds the maximum height limit on the planned drive route, the planned drive route may be determined as a dangerous road, and in this case, an alarm may be sent to the user, and an alternative safe route may be planned to avoid the dangerous road.

It should be noted that in the process of computing the current load or current height of the vehicle according to the shape change information or the tire pressure information, data modeling may be performed according to a preset algorithm based on load data, tire pressure data, and shape change data of the tires of the vehicle. For example, a data model representing the relationship between the load of the vehicle and the tire pressure data or the shape change data may be obtained, and a data model representing the relationship between the height of the vehicle and the tire pressure data or the shape change data may also be obtained. Then, according to above data models, the obtained tire pressure data or shape change data may be used to obtain the current load or current height of the vehicle. Those skilled in the art will appreciate the detailed implementation of establishing the data models.

In the present embodiment, besides comparing the current load or current height of the vehicle with the maximum load limit or the maximum height limit on the planned drive route to determine whether the planned drive route is a dangerous road, the navigation strategy may also utilize the weather information in combination with the above information. For example, in actual driving, if the tire pressure of a vehicle is too high, and if there is a slippery road on the planned drive route, a slip may be caused when driving on the slippery road. Thus, the navigation strategy may be as follows. The terminal obtains the weather information after planning the drive route for the vehicle, and judges whether there is a slippery road on the planned drive route according to the weather information. For example, the terminal may judge whether it will rain or snow in the region where the planned drive route passes, and if it will rain or snow, the terminal determines that a slippery road is on the planned drive route. Further, if it is determined that there is a slippery road on the planned drive route, the terminal may further judge if the current tire pressure reaches a preset alert threshold. If the current tire pressure reaches the preset alert threshold, the vehicle may slip on the slippery road. Therefore, the planned drive route may be determined as a dangerous road if the current tire pressure reaches the preset alert threshold, and in this case, an alarm may be sent to the user, and an alternative safe route may be planned to avoid the dangerous road.

In practice, specific contents of the navigation strategy are not limited to the above contents, and other navigation strategies may be set by users according to the drive environments. For example, a tire wear degree may be obtained, and a distance along which the vehicle may drive safely may be determined according to the tire wear degree. If the tire wear degree is high, and the distance along which the vehicle may drive safely is less than the distance to destination along the planned drive route, an alarm may be sent to the user, and a closer route to the destination may be planned or a drive route to the nearest maintenance station may be planned, which will not described in detail in the present embodiment.

In the above embodiments, a new navigation method is proposed, which obtains status information of the tires of the vehicle and real-time road condition information, and then performs the route navigation for the vehicle according to the status information, the road condition information, and the preset navigation strategy. In this way, the navigation may be performed according to the status of the tires of the vehicle and the real-time road condition during driving, which not only enriches existing navigation systems, but also enables users to adapt to more complicated drive environment.

Figure 2:
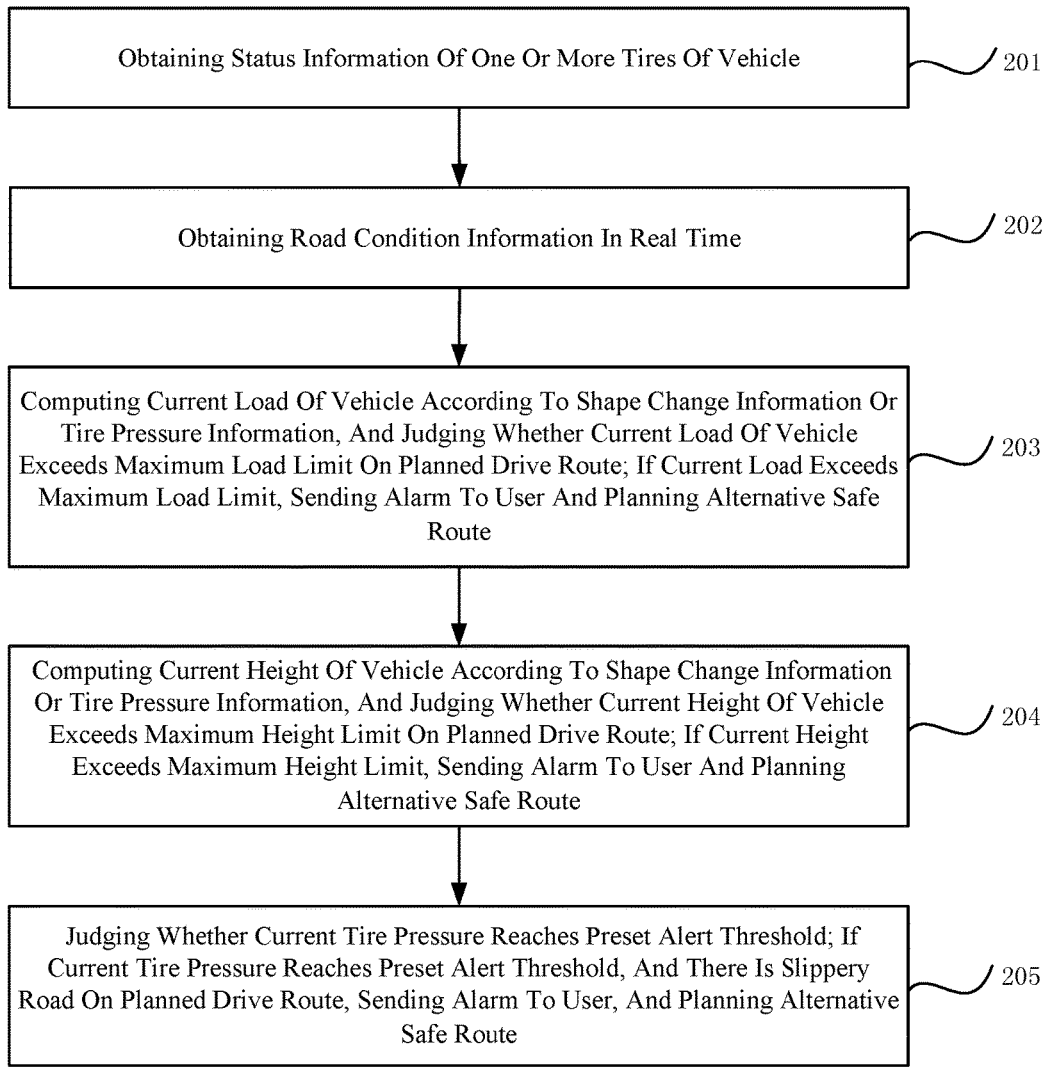
FIG. 2 is a flow chart of a navigation method according to another exemplary embodiment.

FIG. 2 is a flow chart of a navigation method according to an exemplary embodiment. The navigation method is applied in a terminal. As shown in FIG. 2, the navigation method includes following steps.

In step 201, status information of one or more tires of a vehicle is obtained. The status information of the tires of the vehicle includes shape change information or tire pressure information of the tires of the vehicle.

In step 202, road condition information is obtained in real time. The road condition information includes weather information, maximum load limits on possible drive routes that may be planned for the vehicle, and maximum height limits on the possible drive routes.

In step 203, a current load of the vehicle is computed according to the shape change information or the tire pressure information, and it is judged whether the current load of the vehicle exceeds the maximum load limit on a drive route planned for the vehicle. If the current load of the vehicle exceeds the maximum load limit on the planned drive route, an alarm is sent to a user and an alternative safe route is planned.

In step 204, a current height of the vehicle is computed according to the shape change information or the tire pressure information, and it is judged whether the current height of the vehicle exceeds the maximum height limit on the planned drive route. If the current height of the vehicle exceeds the maximum height limit on the planned drive route, an alarm is sent to a user and an alternative safe route is planned.

In step 205, it is judged according to the tire pressure information whether the current tire pressure reaches a preset alert threshold. If the current tire pressure reaches the preset alert threshold, and it is determined according to the weather information that a slippery road is on the planned drive route, an alarm is sent to a user, and an alternative safe route is planned.

The order of step 201 and step 202 may be exchanged, and the order of steps 203, 204, and 205 may be exchanged.

Corresponding to the described navigation method embodiments, the present disclosure also provides a navigation device.

Figure 3:
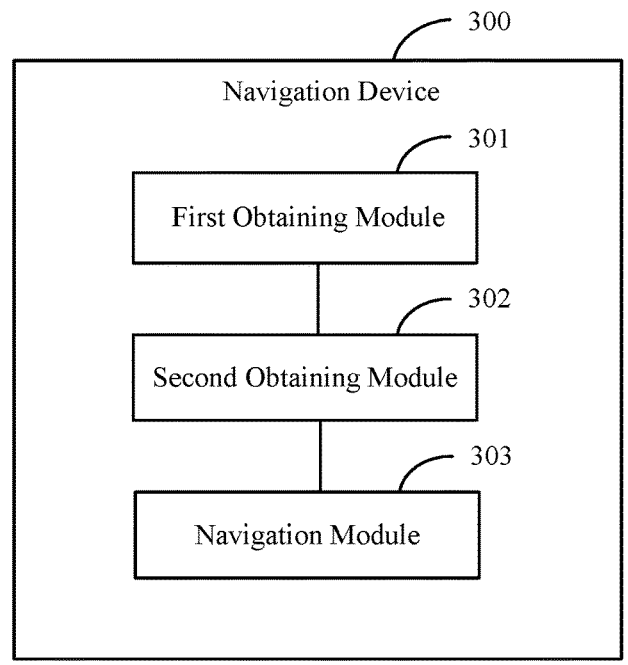
FIG. 3 is a block diagram of a navigation device according to an exemplary embodiment.

FIG. 3 is a block diagram of a navigation device 300 according to an exemplary embodiment.

As shown in FIG. 3, the navigation device 300 according to the exemplary embodiment includes a first obtaining module 301, a second obtaining module 302, and a navigation module 303.

The first obtaining module 301 is configured to obtain status information of one or more tires of a vehicle.

The second obtaining module 302 is configured to obtain road condition information in real time.

The navigation module 303 is configured to perform a route navigation for the vehicle according to the status information, the road condition information, and a preset navigation strategy.

In the present embodiment, the status information of the tires of the vehicle may include shape change information or tire pressure information of the tires of the vehicle. The road condition information may include weather information, maximum load limit on possible drive routes, and maximum height limits on the possible drive routes.

Figure 4:
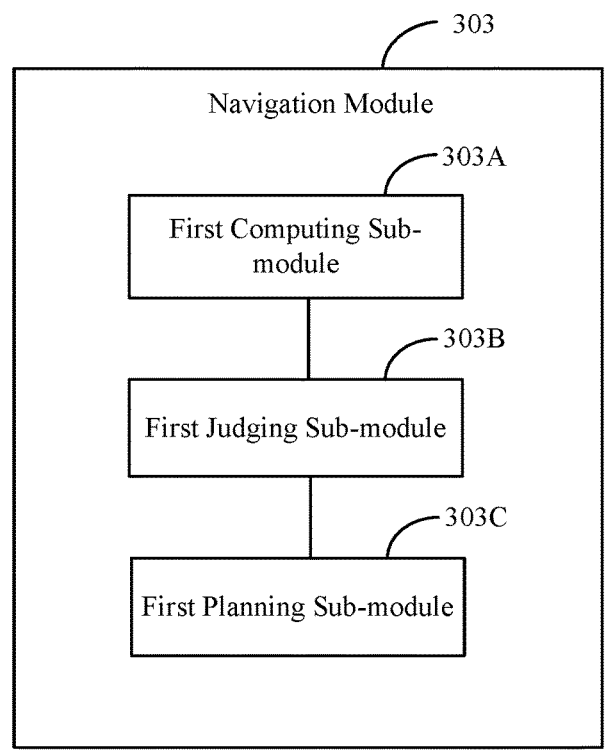
FIG. 4 is a block diagram of a navigation module according to an exemplary embodiment.

FIG. 4 is a block diagram of the navigation module 303 according to an exemplary embodiment. Referring to FIG. 4, the navigation module 303 includes a first computing sub-module 303A, a first judging sub-module 303B, and a first planning sub-module 303C, based on the embodiment shown in FIG. 3.

The first computing sub-module 303A is configured to compute a current load of the vehicle according to the shape change information or the tire pressure information of the tires of the vehicle.

The first judging sub-module 303B is configured to judge whether the current load of the vehicle exceeds the maximum load limit on a planned drive route.

The first planning sub-module 303C is configured to send an alarm to a user and plan an alternative safe route if the current load of the vehicle exceeds the maximum load limit on the planned drive route.

Figure 5:
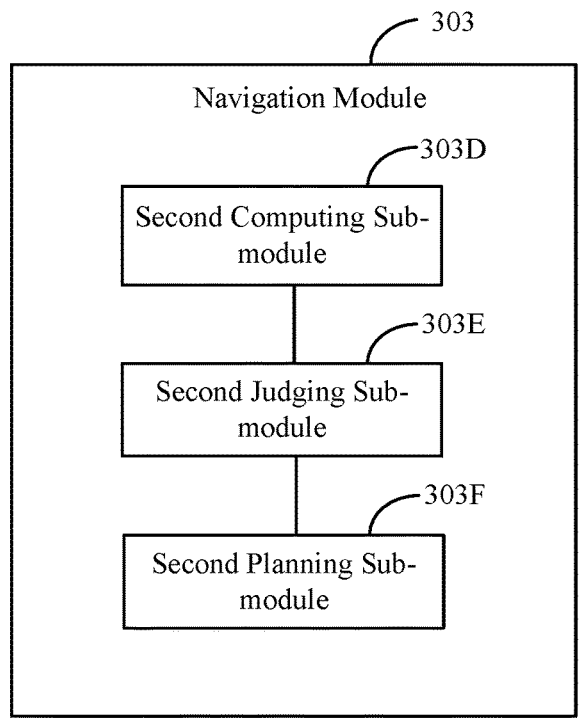
FIG. 5 is a block diagram of a navigation module according to another exemplary embodiment.

FIG. 5 is a block diagram of the navigation module 303 according to another exemplary embodiment. Referring to FIG. 5, the navigation module 303 may include a second computing sub-module 303D, a second judging sub-module 303E, and a second planning sub-module 303F, based on the embodiment shown in FIG. 3.

The second computing sub-module 303D is configured to compute a current height of the vehicle according to the shape change information or the tire pressure information of the tires of the vehicle.

The second judging sub-module 303E is configured to judge whether the current height of the vehicle exceeds the maximum height limit on the planned drive route.

The second planning sub-module 303F is configured to send an alarm to a user and plan an alternative safe route if the current height of the vehicle exceeds the maximum height limit on the planned drive route.

It should be noted that, the second computing sub-module 303D, the second judging sub-module 303E, and the second planning sub-module 303F included in the navigation module 303 of the embodiment shown in FIG. 5 may also be included in the navigation module 303 of the embodiment shown in FIG. 4, which will not be limited in the present disclosure.

Figure 6:
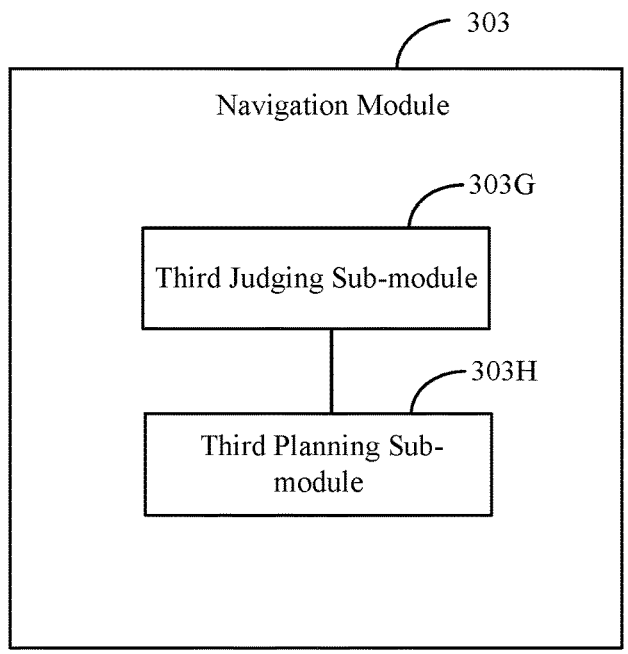
FIG. 6 is a block diagram of a navigation module according to another exemplary embodiment.

FIG. 6 is a block diagram of the navigation module 303 according to another exemplary embodiment. Referring to FIG. 6, the navigation module 303 may include a third judging sub-module 303G and a third planning sub-module 303H, based on the embodiment shown in FIG. 3.

The third judging sub-module 303G is configured to judge according to the tire pressure information whether the current tire pressure reaches a preset alert threshold.

The third planning sub-module 303H is configured to send an alarm to a user and plan an alternative safe route if the current tire pressure of the vehicle reaches the preset alert threshold, and it is determined according to the weather information that there is a slippery road on the previously planned drive route.

It should be noted that, the third judging sub-module 303G and the third planning sub-module 303H included in the navigation module 303 of the embodiment shown in FIG. 6 may also be contained in the navigation module 303 of the embodiment shown in FIG. 4 or 5, which will not be limited in the present disclosure.

Figure 7:
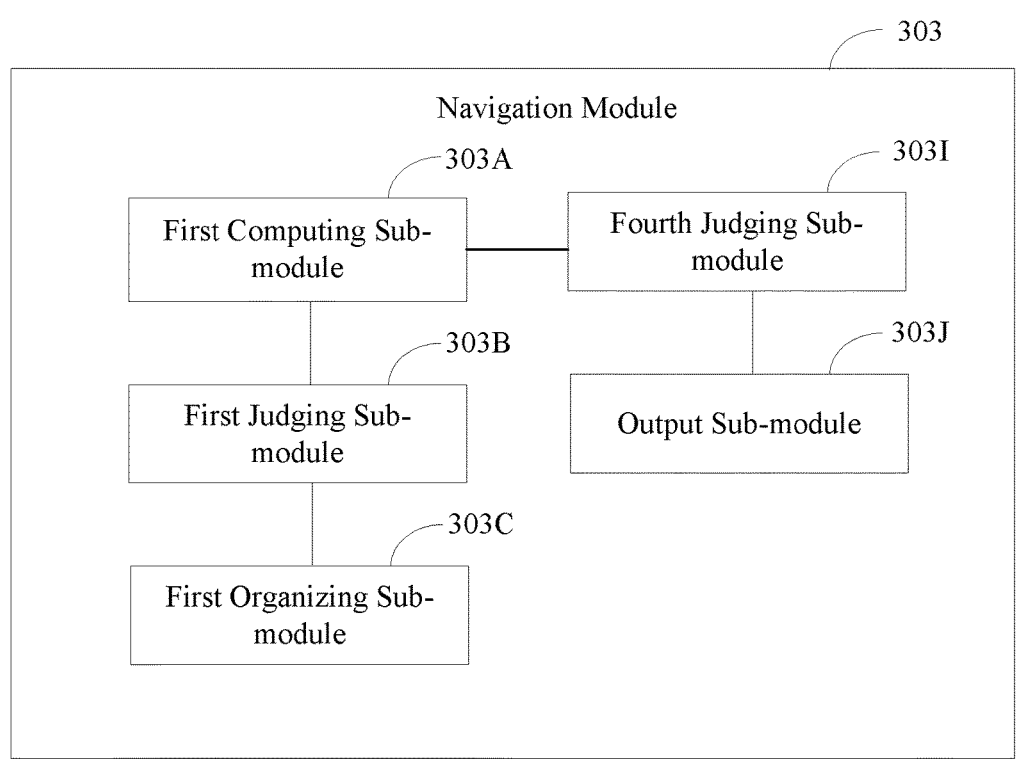
FIG. 7 is a block diagram of a navigation module according to another exemplary embodiment.

FIG. 7 is a block diagram of the navigation module 303 according to another exemplary embodiment. Referring to FIG. 7, the navigation module 303 may include a fourth judging sub-module 303I and an output sub-module 303J, as well as the first computing sub-module 303A, the first judging sub-module 303B, and a first planning sub-module 303C shown in FIG. 4.

The fourth judging sub-module 303I is configured to judge whether the current load of the vehicle exceeds the maximum load limit of the vehicle.

The output sub-module 303J is configured to determine that the vehicle is overloaded and send an alarm to the user if the current load of the vehicle exceeds the maximum load limit of the vehicle.

It should be noted that, the fourth judging sub-module 303I and the output sub-module 303J included in the navigation module 303 of the embodiment shown in FIG. 6 may also be included in the navigation module 303 of the embodiment shown in FIG. 3, 5, or 6, which will not be limited in the present disclosure.

Since the device embodiments are substantially corresponding to the method embodiments, the related aspects may be referred to the description in the method embodiments. The device embodiments described above are only exemplary, and modules illustrated as separate components therein may be or may not be physically separated from each other, and components represented as modules may be or may not be physical modules, i.e., may be located in a same place or may be distributed in multiple network units. Some or all of the modules may be selected according to the actual requirements so as to achieve objectives of the present disclosure, which may be understood or implemented by those skilled in the art without creative work.

Accordingly, a navigation device is also provided in the present disclosure, and the navigation device includes a processor and a memory configured to store instructions executable by the processor. The processor is configured to obtain status information of tires of a vehicle; obtain real-time road condition information; and perform a route navigation for the vehicle according to the status information, the road condition information and a preset navigation strategy.

Figure 8:
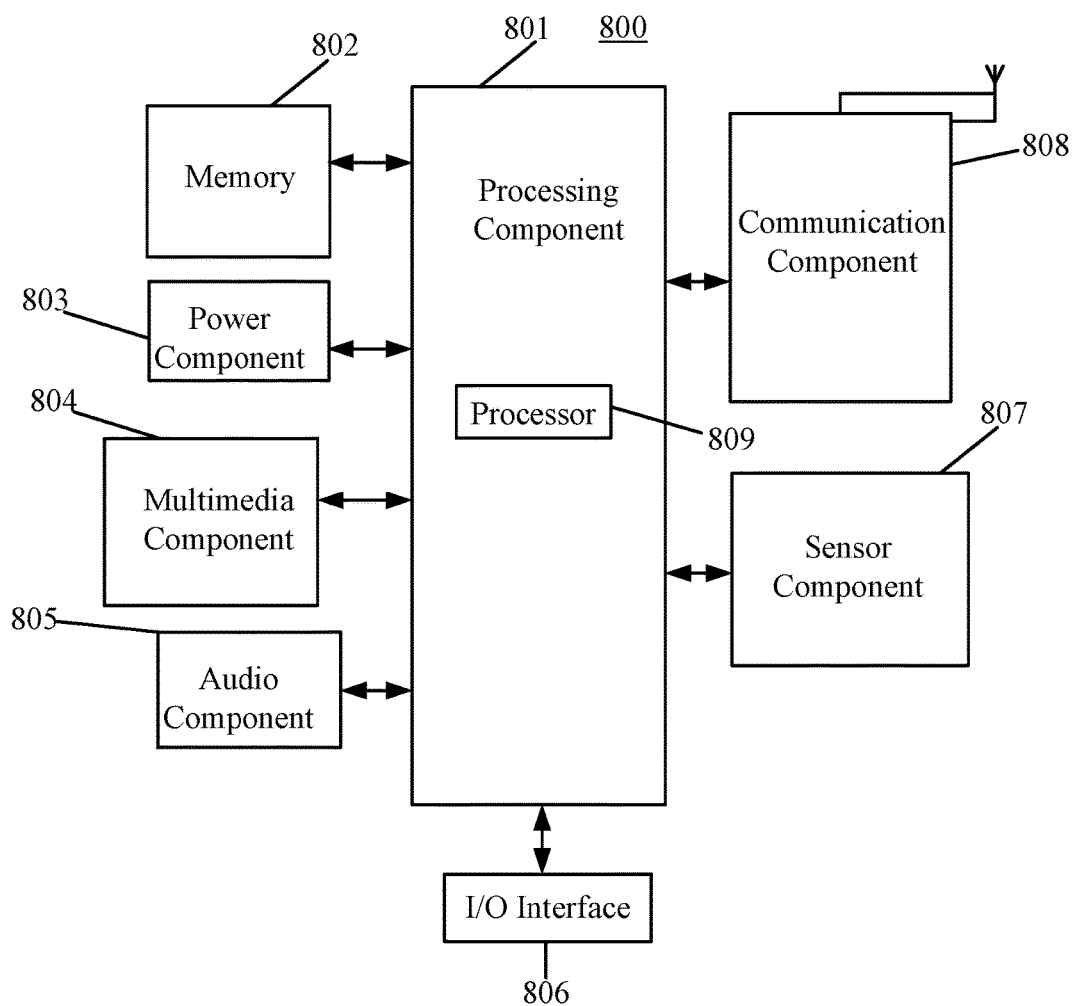
FIG. 8 is a block diagram of a navigation device according to an exemplary embodiment.

FIG. 8 is a block diagram illustrating a navigation device 800 according to an exemplary embodiment.

As shown in FIG. 8, the navigation device 800 according to an exemplary embodiment may be a mobile phone, a navigation equipment, a computer, an in-vehicle computer, a digital broadcasting terminal, a messaging device, a game console, a tablet device, a medical device, exercise equipment, and a personal digital assistant, etc.

Referring to FIG. 8, the navigation device 800 may include one or more of following components: a processing component 801, a memory 802, a power component 803, a multimedia component 804, an audio component 805, an input/output (I/O) interface 806, a sensor component 807, and a communication component 808.

The processing component 801 typically controls overall operations of the device 800, such as the operations associated with display, telephone calls, data communications, camera operations, and recording operations. The processing component 801 may include one or more processors 809 to execute instructions to perform all or part of the steps in the above described methods. Moreover, the processing component 801 may include one or more modules which facilitate the interaction between the processing component 801 and other components. For instance, the processing component 801 may include a multimedia module to facilitate the interaction between the multimedia component 804 and the processing component 801.

The memory 802 is configured to store various types of data to support the operation of the device 800. Examples of such data include instructions for any applications or methods operated on the device 800, contact data, phonebook data, messages, pictures, video, etc. The memory 802 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 803 provides power to various components of the device 800. The power component 803 may include a power management system, one or more power sources, and any other components associated with the generation, management, and distribution of power in the device 800.

The multimedia component 804 includes a screen providing an output interface between the device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and other gestures on the touch panel. The touch sensors may not only sense a boundary of a touch or swipe action, but also sense a duration time and a pressure associated with the touch or swipe action. In some embodiments, the multimedia component 804 includes a front camera and/or a rear camera. The front camera and the rear camera may receive external multimedia data while the device 800 is in an operation mode, such as a photographing mode or a video mode. Each of the front camera and the rear camera may be a fixed optical lens system or have focus and optical zoom capability.

The audio component 805 is configured to output and/or input audio signals. For example, the audio component 805 includes a microphone configured to receive an external audio signal when the device 800 is in an operation mode, such as a call mode, a recording mode, and a voice recognition mode. The received audio signal may be further stored in the memory 802 or transmitted via the communication component 808. In some embodiments, the audio component 805 further includes a speaker to output audio signals.

The I/O interface 806 provides an interface between the processing component 801 and peripheral interface modules, such as a keyboard, a click wheel, buttons, and the like. The buttons may include, but are not limited to, a home button, a volume button, a starting button, and a locking button.

The sensor component 807 includes one or more sensors to provide status assessments of various aspects of the device 800. For instance, the sensor component 807 may detect an open/closed status of the device 800 and relative positioning of components (e.g., the display and the keypad of the device 800). The sensor component 807 may also detect a change in position of the device 800 or of a component in the device 800, a presence or absence of user contact with the device 800, an orientation or an acceleration/deceleration of the device 800, and a change in temperature of the device 800. The sensor component 807 may include a proximity sensor configured to detect the presence of nearby objects without any physical contact. The sensor component 807 may also include a light sensor, such as a CMOS or CCD image sensor, for use in imaging applications. In some embodiments, the sensor component 807 may also include an accelerometer sensor, a gyroscope sensor, a magnetic sensor, a pressure sensor, or a temperature sensor.

The communication component 808 is configured to facilitate wired or wireless communication between the device 800 and other devices. The device 800 can access a wireless network based on a communication standard, such as WIFI, 2G, or 3G, or a combination thereof. In one exemplary embodiment, the communication component 808 receives a broadcast signal or broadcast associated information from an external broadcast management system via a broadcast channel. In one exemplary embodiment, the communication component 808 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium comprising instructions, such as the memory 802 comprising instructions. The above instructions are executable by the processor 809 in the device 800, for performing the above-described methods. For example, the non-transitory computer-readable storage medium may be a ROM, a RAM, a CD-ROM, a magnetic tape, a floppy disc, an optical data storage device, and the like.

When the instructions in the storage medium are executed by the processor of a terminal, the terminal can implement a navigation method, comprising: obtaining status information of one or more tires of a vehicle; obtaining road condition information in real time; and performing a route navigation for the vehicle according to the status information, the road condition information and a preset navigation strategy.

Other embodiments of the invention will be clear to those skilled in the art from consideration of the specification and practice of the invention disclosed here. This application is intended to cover any variations, uses, or adaptations of the invention following the general principles thereof and comprising such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing form the scope thereof. It is intended that the scope of the invention only be limited by the appended claims.

What is claimed is:

1. A navigation method for use in a device, comprising:
obtaining status information of one or more tires of a vehicle;
obtaining road condition information in real time; and
performing a route navigation for the vehicle according to the status information, the road condition information, and a preset navigation strategy,
wherein the status information of the one or more tires of the vehicle comprises shape change information and tire pressure information of the one or more tires of the vehicle,
the road condition information comprises weather information, maximum load limits on possible drive routes, and maximum height limits on the possible drive routes, and
the performing the route navigation for the vehicle includes:
determining, according to the weather information included in the obtained road condition information, whether there is a slippery road on a drive route planned for the vehicle;
in response to determining that there is a slippery road on the drive route planned for the vehicle, determining, according to the tire pressure information of the one or more tires of the vehicle, whether a current pressure of the one or more tires of the vehicle reaches a preset alert threshold; and
in response to determining that the current pressure of the one or more tires of the vehicle reaches the preset alert threshold, sending an alarm to a user and planning an alternative route.

2. The navigation method according to claim 1, wherein performing the route navigation for the vehicle according to the status information, the road condition information, and the preset navigation strategy comprises:
computing a current load of the vehicle according to the shape change information;
judging whether the current load of the vehicle exceeds the maximum load limit on a drive route planned for the vehicle; and
if the current load of the vehicle exceeds the maximum load limit on the planned drive route, sending an alarm to a user and planning an alternative route.

3. The navigation method according to claim 2, further comprising:
judging whether the current load of the vehicle exceeds a maximum load limit of the vehicle; and
if the current load of the vehicle exceeds the maximum load limit of the vehicle, determining that the vehicle is overloaded and sending an alarm to the user.

4. The navigation method according to claim 1, wherein performing the route navigation for the vehicle according to the status information, the road condition information, and the preset navigation strategy comprises:
computing a current height of the vehicle according to the shape change information;
judging whether the current height of the vehicle exceeds the maximum height limit on a drive route planned for the vehicle; and
if the current height of the vehicle exceeds the maximum height limit of the planned drive route, sending an alarm to a user and planning an alternative route.

5. The navigation method according to claim 1, wherein collecting the shape change information of the one or more tires comprises:
recording, by the one or more cameras, pictures of the one or more tires periodically in the memory device; and
reading the pictures from the memory device and comparing the pictures to obtain the shape change information.

6. The navigation method according to claim 1, wherein the shape change information includes height change information or volume change information.

7. A navigation device, comprising:
a processor; and
a memory configured to store instructions executable by the processor;
wherein the processor is configured to:
obtain status information of one or more tires of a vehicle;
obtain road condition information in real time; and
perform a route navigation for the vehicle according to the status information, the road condition information, and a preset navigation strategy,
wherein the status information of the one or more tires of the vehicle comprises shape change information and tire pressure information of the one or more tires of the vehicle,
the road condition information comprises weather information, maximum load limits on possible drive routes, and maximum height limits on drive routes, and
in performing the route navigation for the vehicle, the processor is further configured to:
determine, according to the weather information included in the obtained road condition information, whether there is a slippery road on a drive route planned for the vehicle;
in response to determining that there is a slippery road on the drive route planned for the vehicle, determine, according to the tire pressure information of the one or more tires of the vehicle, whether a current pressure of the one or more tires of the vehicle reaches a preset alert threshold; and
in response to determining that the current pressure of the one or more tires of the vehicle reaches the preset alert threshold, send an alarm to a user and plan an alternative route.

8. The navigation device according to claim 7, wherein the processor is configured to:
compute a current load of the vehicle according to the shape change information;
judge whether the current load of the vehicle exceeds the maximum load limit on a drive route planned for the vehicle; and
if the current load of the vehicle exceeds the maximum load limit on the planned drive route, send an alarm to a user and plan an alternative route.

9. The navigation device according to claim 8, wherein the processor is further configured to:
judge whether the current load of the vehicle exceeds a maximum load limit of the vehicle; and
if the current load of the vehicle exceeds the maximum load limit of the vehicle, determine that the vehicle is overloaded and send an alarm to the user.

10. The navigation device according to claim 7, wherein the processor is configured to:
compute a current height of the vehicle according to the shape change information;

judge whether the current height of the vehicle exceeds the maximum height limit on a drive route planned for the vehicle; and if the current height of the vehicle exceeds the maximum height limit of the planned drive route, send an alarm to a user and plan an alternative route.

11. The navigation device according to claim 7, wherein the processor is configured to:

record pictures of the one or more tires periodically in the memory device; and read the pictures from the memory device and compare the pictures to obtain the shape change information.

12. The navigation device according to claim 7, wherein the shape change information includes height change information or volume change information.

13. A non-transitory computer-readable storage medium having stored therein instructions that, when executed by a processor of a terminal, cause the terminal to perform a navigation method, the navigation method comprising:

obtaining status information of one or more tires of a vehicle;

obtaining road condition information in real time; and performing a route navigation for the vehicle according to the status information, the road condition information, and a preset navigation strategy, wherein the status information of the one or more tires of the vehicle comprises shape change information and tire pressure information of the one or more tires of the vehicle, the road condition information comprises weather information, maximum load limit on possible drive routes, and maximum height limits on the possible drive routes, and the performing the route navigation for the vehicle includes:

determining, according to the weather information included in the obtained road condition information, whether there is a slippery road on a drive route planned for the vehicle;

in response to determining that there is a slippery road on the drive route planned for the vehicle, determining, according to the tire pressure information of the one or more tires of the vehicle, whether a current pressure of the one or more tires of the vehicle reaches a preset alert threshold; and in response to determining that the current pressure of the one or more tires of the vehicle reaches the preset alert threshold, sending an alarm to a user and planning an alternative route.

14. The storage medium according to claim 13, wherein performing the route navigation for the vehicle according to the status information, the road condition information, and the preset navigation strategy comprises:

computing a current load of the vehicle according to the shape change information;

judging whether the current load of the vehicle exceeds the maximum load limit on a drive route planned for the vehicle; and if the current load of the vehicle exceeds the maximum load limit on the planned drive route, sending an alarm to a user and planning an alternative route.

15. The storage medium according to claim 14, wherein the navigation method further comprises:

judging whether the current load of the vehicle exceeds a maximum load limit of the vehicle; and if the current load of the vehicle exceeds the maximum load limit of the vehicle, determining that the vehicle is overloaded and sending an alarm to the user.

16. The storage medium according to claim 13, wherein performing the route navigation for the vehicle according to the status information, the road condition information, and the preset navigation strategy comprises:

computing a current height of the vehicle according to the shape change information;

judging whether the current height of the vehicle exceeds the maximum height limit on a drive route planned for the vehicle; and if the current height of the vehicle exceeds the maximum height limit of the planned drive route, sending an alarm to a user and planning an alternative route.

17. The storage medium according to claim 13, wherein collecting the shape change information of the one or more tires comprises:

recording, by the one or more cameras, pictures of the one or more tires periodically in the memory device; and reading the pictures from the memory device and comparing the pictures to obtain the shape change information.

18. The storage medium according to claim 13, wherein the shape change information includes height change information or volume change information.

* * * * *